CHURCH, OBERT, WILLOUGHBY & WILLOUGHBY.
Harvester Cutter Knives.
No. 5,228. Patented Aug. 7, 1847.
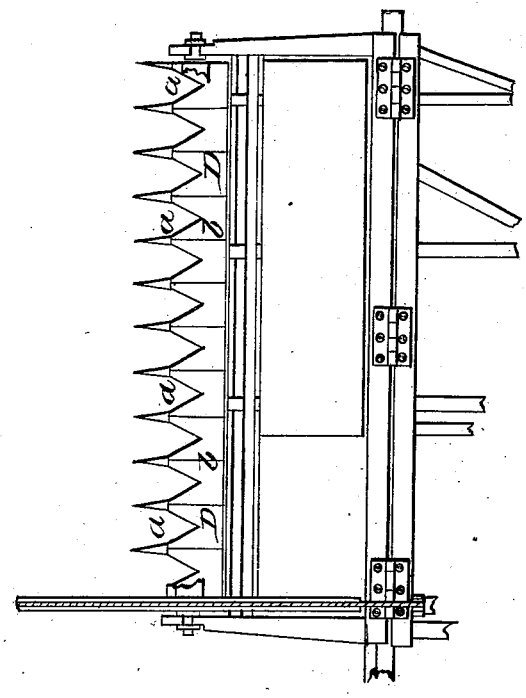

UNITED STATES PATENT OFFICE.

MARTIN BUTTS AND LAURETTE CHURCH, (ADMINISTRATORS OF D. A. CHURCH, DECEASED,) OF FRIENDSHIP, N. Y., L. H. OBERT, OF SAME PLACE, AND W. W. WILLOUGHBY AND O. F. WILLOUGHBY, OF CHICAGO, ILL.

IMPROVEMENT IN HARVESTING-MACHINES.

Specification forming part of Letters Patent No. 5,228, dated August 7, 1847.

*To all whom it may concern:*

Be it known that DAMON A. CHURCH, late of Friendship, in the county of Allegany, in the State of New York, deceased, LOVETT H. OBERT, of the same place, and WESTON W. WILLOUGHBY and O. F. WILLOUGHBY, of Chicago, in the county of Cook and State of Illinois, have invented a new and useful improvement in the manner of constructing or forming the cutting knives or blades that are used in machines for the cutting of grain and grass; and we do hereby declare that the following is a full and exact description thereof.

This improvement in the manner of forming the cutting knives or blades was described and represented in an application made for Letters Patent for improvements in machine for cutting, thrashing, and cleansing grain, made by the parties herein named, but was coupled with other improvements in the said machine; but the Commissioner of Patents having decided that the improvement in the knives and that in the straw carrier or separator "are distinct inventions, appliable to distinct machines, and cannot therefore be embraced under one patent," the claim to the improvement in the knives or cutters has been stricken out of said application and is herein made the sole subject of claim.

In the accompanying drawing, D D represent the improved knives or cutters, against which the grain or grass is to be forced by means of what is known in reaping or harvesting machines as a "gathering-wheel," such as is described in Letters Patent granted to Damon A. Church under date of the 4th day of May, 1841, and is well known as used in this and other machines for a like purpose. It has been the practice heretofore to unite the knives or cutters with each other at their interior angles, as at *a a*, there being a joint between each contiguous knife in that part. It has been found, however, that such knives, although made and joined together with the utmost care, eventually become open in the joint, lose their interior cutting-angle, and admit the fibers of vegetable matter between them. This difficulty the applicants have obviated by constructing the knives so as to be solid in that part, their junction with each other being made in the line *b b* of their outer angles.

Having thus fully described the nature of our improvement in the manner of forming and combining the knives or cutters used in machines for reaping and mowing, what we claim therein as new, and desire to secure by Letters Patent, is—

The forming such knives solid at their inner angles, as herein described and represented, and for the purposes set forth.

MARTIN BUTTS,
   LAURETTE CHURCH,
 *Administrators of the estate of Damon A. Church, deceased.*
   LOVETT H. OBERT.
   W. W. WILLOUGHBY.
   O. F. WILLOUGHBY.

Witnesses to the signatures of Martin Butts, Laurette Church, Lovett H. Obert, and O. F. Willoughby:
 WM. H. KING,
 L. F. CHAPMAN.

Winesses to the signature of W. W. Willoughby:
 D. A. CRABTREE,
 JESSE OATMAN.